United States Patent [19]

Ishise et al.

[11] Patent Number: 4,479,031
[45] Date of Patent: Oct. 23, 1984

[54] HEAT-SHRINKABLE TUBE WITH SEMICONDUCTIVE PARTS FOR USE IN JOINING ELECTRICAL CABLES

[75] Inventors: Kojiro Ishise; Keiichi Kojima, both of Osaka, Japan

[73] Assignee: Sumitomo Electric Industries, Inc., Osaka, Japan

[21] Appl. No.: 310,245

[22] Filed: Oct. 9, 1981

Related U.S. Application Data

[62] Division of Ser. No. 168,228, Jul. 10, 1980, abandoned.

[30] Foreign Application Priority Data

Jul. 10, 1979 [JP] Japan ................................ 54-87641
Jul. 10, 1979 [JP] Japan ................................ 54-87642

[51] Int. Cl.$^3$ ...................... H02G 15/18; H02G 15/08
[52] U.S. Cl. .................................. 174/73 R; 174/85; 174/DIG. 8
[58] Field of Search .............. 174/73 R, 73 SC, 84 R, 174/85, DIG. 8; 156/49, 86

[56] References Cited

U.S. PATENT DOCUMENTS

| | | | |
|---|---|---|---|
| 3,382,308 | 5/1968 | Short | 174/73 R X |
| 3,717,717 | 2/1973 | Cunningham et al. | 174/73 R |
| 3,761,602 | 9/1973 | DeSio et al. | 174/73 SC |
| 3,816,640 | 6/1974 | Varner | 174/73 R |

FOREIGN PATENT DOCUMENTS

| | | | |
|---|---|---|---|
| 325439 | 3/1935 | Italy | 174/85 |
| 339227 | 12/1930 | United Kingdom | 174/143 |
| 898762 | 6/1962 | United Kingdom | 174/85 |

*Primary Examiner*—Laramie E. Askin
*Attorney, Agent, or Firm*—Sughrue, Mion, Zinn, Macpeak & Seas

[57] ABSTRACT

A heat-shrinkable tube for use in forming a connection part for shielded polyolefin insulated electrical wires or cables. The heat-shrinkable tube comprises an integrated assembly of two cylindrical heat-shrinkable semiconductive members arranged end-to-end and surrounded and joined at the adjacent ends thereof by an insulation material. The shrink ratio of a narrow region of the heat-shrinkable tube defined by the adjacent ends and joining insulation material is smaller than that of the remainder of the tube. The adjacent ends of the cylindrical members may partially overlap each other, and a portion of each adjacent end may be folded back upon itself to produce a rounded shape for avoiding concentration of the electric field.

4 Claims, 3 Drawing Figures

HEAT-SHRINKABLE TUBE WITH SEMICONDUCTIVE PARTS FOR USE IN JOINING ELECTRICAL CABLES

This is a Division of application Ser. No. 168,228, filed July 10, 1980, now abandoned.

BACKGROUND OF THE INVENTION

1. Field of the Invention

This invention relates to a heat-shrinkable tube for use in forming a connection part for shielded polyolefin insulated electrical wires or cables.

2. Description of the Prior Art

Recently, cross-linked polyethylene insulated electrical wires and cables have tended to be used at much higher voltages, and accompanied with this tendency further improved reliability of connection parts for cross-linked polyethylene insulated electrical wires and cables is required. For this purpose, it has been heretofore proposed to use so-called molded connection parts, which are obtained by applying a reinforcing insulation layer made of rubber, plastics, etc., around a connection part of an electrical wire or cable and heat molding this assembly under pressure to cause the reinforcing insulation layer to form an integrated unit with the insulation layer of the cable.

On the other hand, there has also been a recent tendency that in the practical application of these molded connection parts of wires and cables, coverage of distances much longer than ever before are encountered and therefore it has become increasingly necessary to provide an insulated connection part in which a specific insulated portion, i.e., an insulated portion having a specific structure consisting of two shielding members (outer semiconductive members) combined with each other through an insulation material, is provided. Heretofore, conventional methods for forming molded connection parts for cross-linked polyethylene insulated electrical wires or cables have generally comprised applying a reinforcing layer around the insulated connection part by winding a tape made of polyethylene containing a cross-linking agent or cross-linked polyethylene, or alternatively pouring such cross-linking agent containing polyethylene or cross-linked polyethylene into a metal mold provided around the connection part, winding around the thus-provided reinforcing layer a tape of a semiconductive material, and then a tape of an insulating material, to thereby form a specific insulated portion. Since these conventional methods require heat molding of the connection part as a whole simultaneously after providing the semiconductor and the specific insulated portion, they may produce many defects. For example, the tip of the outer semiconductive layer in the specific insulated portion can be fluidized or deformed to form a sharp protrusion, and the interface between the reinforcing insulation layer and the connection part can undulate and lose smoothness such that the electrical wire or cable cannot provide satisfactory electrical properties.

In order to eliminate the above-described disadvantages, a method has heretofore been proposed which comprises grinding the surface of the reinforcing insulation layer after heat molding to smooth it, winding a tape of semiconductive material around a reinforcing layer on one conductor in a region extending from one end of the reinforcing layer to the center thereof and then winding a tape of an insulating material around the end of the wound tape of the semiconductive layer to thereby form a specific insulated portion, and winding a tape of semiconductive material around the other conductor. This method, however, is disadvantageous in that molding takes a rather long time.

SUMMARY OF THE INVENTION

The object of this invention is, therefore, to overcome the above-described defects and to provide good molded connection parts for electrical wires and cables.

As a result of extensive research it has been found that a connection part of cross-linked polyolefin insulated electrical wires or cables having excellent electrical properties can be obtained in a reduced working period by providing on a cross-linkable reinforcing layer a heat shrinkable tube having a construction of a specific insulated portion (i.e., an insulated portion having a specific structure consisting of two cylindrical heat shrinkable semiconductive members combined with each other through an insulation material), heating the tube to shrink and snugly enclose the reinforcing layer, and then heat molding the reinforcing insulation layer to effect cross-linking.

This invention is based on the above finding and provides, among other things, a heat-shrinkable tube comprising an integrated assembly of two cylindrical heat-shrinkable semiconductive members arranged end-to-end, and a specific insulated portion consisting of the two cylindrical heat-shrinkable semiconductive members surrounded and joined at their adjacent ends by an insulation material.

BRIEF DESCRIPTION OF THE ACCOMPANYING DRAWINGS

DETAILED DESCRIPTION OF THE INVENTION

Figure 1:
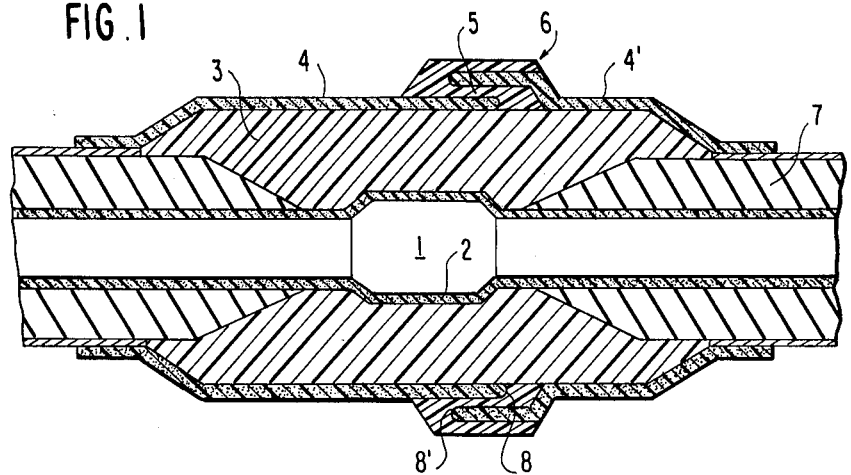
FIG. 1 is a schematic longitudinal cross-sectional view of an insulated connection part obtainable according to this invention.
Figure 2:
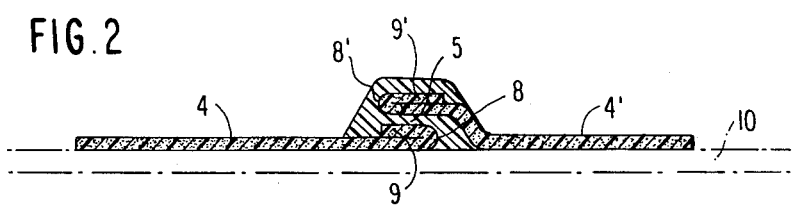
FIG. 2 is a schematic longitudinal sectional view of the upper half of a heat shrinkable tube according to this invention.
Figure 3:
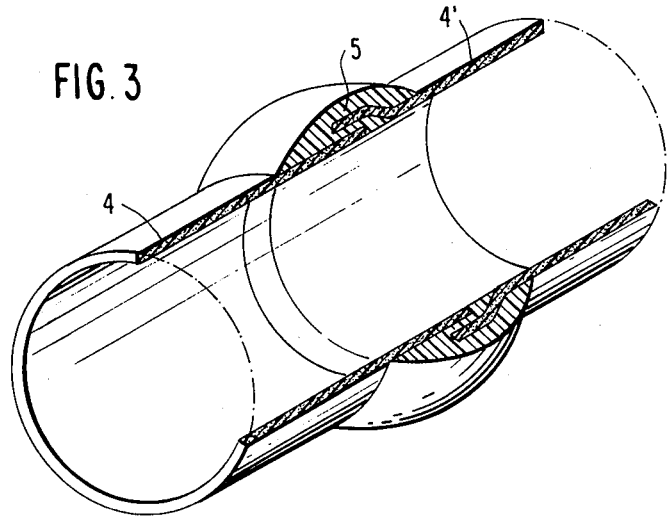
FIG. 3 is a schematic perspective view of a heat-shrinkable tube according to this invention with a portion thereof cut away to illustrate the interior structure of the tube.

With reference to the FIGS. 1 and 2 this invention will be described in greater detail hereinbelow.

On a connection part 1 of a conductor is applied an inner semiconductive layer 2, and then a reinforcing insulation layer 3 is provided on the inner semiconductive layer 2. As a material for producing the reinforcing insulation layer 3, polyolefins that are employed conventionally in cable insulation can be used, such as polyethylene, uncross-linked polyethylene containing a cross-linking agent such as dicumyl peroxide, ethylene/propylene copolymers, etc. These materials can be applied in the form of a tape by winding it around the inner semiconductor, or alternatively they can be applied by pouring into a metal mold (not shown) placed around the inner semiconductive layer 2. It is preferred to apply the reinforcing material by pouring into a metal mold, since the surface of the reinforcing insulation layer is thus rendered smooth, and the interface between the outer semiconductive members 4, 4' and a specific insulated portion 5 becomes smoother.

On the thus-formed reinforcing insulation layer 3 is placed a heat shrinkable tube 6 comprising the outer semiconductive members 4 and 4' and the specific insulated portion 5 and the tube 6 is heat shrunk using a burner, torch lamp, or similar conventional heating means. Thereafter, the whole assembly of connection parts is heated under pressure to cause the reinforcing insulation layer 3, inner semiconductive layer 2, cable insulator 7 and heat shrinkable tube 6 to become integrated with each other, thereby forming an insulated connection part for cross-linked polyolefin insulated electrical wires or cables.

With respect to the heat shrinkable tube 6 used in this invention tips 8 and 8' of the semiconductive members in the specific insulated portion 5 are formed in a round shape in order to avoid concentration of the electric field. Preferably, the tips 8 and 8' may be folded as shown in FIG. 2. Examples of materials for the specific insulated portion 5 include thermoplastic resins which can adhere to the reinforcing insulation layer 3, such as polyethylene, ethylene-vinyl acetate copolymers, ethylene-propylene copolymers, etc., since it is desirable to bond the specific insulated portion 5 to the reinforcing insulation layer 3 in order for the resulting electrical wires or cables to have satisfactory electric properties. A mixture of the above-described thermoplastic resin and carbon black can be used as a material for producing the outer semiconductive members 4 and 4'.

The heat shrinkable tube 6 can be produced as follows. First, a semiconductive heat shrinkable tube member 4 is formed by bombarding electron beams onto a tube made of the above-described semiconductive material, or by heating a tube of semiconductive material, or by heating a tube of semiconductive material containing a cross-linking agent, to effect cross-linking, and then heating the cross-linked material at a temperature higher than the softening point thereof to endow heat-shrinkability to the material thereby obtaining a semiconductive heat shrinkable member. Then, two heat shrinkable tube members 4 and 4' thus-produced are combined with each other through the specific insulated portion 5 comprising the above-described insulating material so as to form an assembly of the outer semiconductive members 4 and 4' with the specific insulated portion 5. Preferably, the tips 8 and 8' of the semiconductive members 4 and 4' in the specific insulated portion may overlap each other. The assembly is then placed around a metal pipe having a diameter larger than that of the reinforcing insulation layer 3 and heated to form an integrated unit which retains heat-shrinkability.

More particularly, a heat shrinkable tube according to a preferred embodiment of this invention is produced as follows.

A tube having an inner diameter of 25 mm and a thickness of 2 mm is extrusion molded using a semiconductive polyethylene blended with carbon black and expanded so as to have an inner diameter of 70 mm after it is bombarded with electron beams at an intensity of 15 Mrad. A tube member 30 cm in length is cut out of this tube and one end 9 thereof is folded in a length of 5 cm as shown in FIG. 2. The thus-obtained tube member 4 is placed over the surface of a longitudinally split half pipe of aluminum pipe 10 and is heated using a torch lamp (not shown) to effect shrinking.

Then, a cross-linked polyethylene tape which has preliminarily been elongated longitudinally is wound around the folded end 9 of the tube and the surface of the aluminum pipe adjacent thereto to a thickness of about 3 mm.

Further, another semiconductive heat shrinkable tube member 4' having one end 9' thereof folded in the same manner as above is placed so that it covers a part of the portion on which cross-linked polyethylene is wound and the aluminum pipe. The thus-formed assembly on the aluminum pipe is then heated using a torch lamp to cause shrinkage. After the whole assembly is heated at 150° C. for 30 minutes to form an integrated unit, the aluminum pipe is removed to obtain a heat shrinkable tube of this invention.

It is preferred to further bombard electron beams onto the heat shrinkable tube thus-obtained in a narrow region thereof, including the specific insulated portion 5, at an intensity of 20 Mrad, in order to render the shrink ratio of the region including the specific insulated portion 5 smaller than the shrink ratio of the remainder of the heat shrinkable tube.

Since, in the heat shrinkable tube 6 according to this invention, the semiconductive members 4 and 4' and the specific insulated portion 5 together form an integrated unit preliminarily before use, there is no occurrence of disadvantageous phenomenon such as that the tip of the outer semiconductive member in the specific insulated portion is fluidized or deformed to form a sharp protrusion leading to deteriorated electrical properties which would often be encountered in the conventional method in which an outer semiconductive member and the specific insulated portion are formed by winding un-cross-linked polyethylene tape around the reinforcing insulation layer and these members are heat molded simultaneously together with the reinforcing insulation material.

In addition to the above, insulated electrical wires and cables produced in accordance with this invention have another advantage. That is, in the heat shrinkable tube according to this invention, the shrink ratio of the specific insulated portion and the neighboring region is made smaller than the shrink ratio of the remainder of the heat shrinkable tube, and as a result this invention is free of the problem of shape retention at the connecting part of the wires or cables, and the problem wherein the tip of the outer semiconductive layer in the specific insulated portion penetrates into the reinforcing insulation layer, which would be observed in the case wherein the outer semiconductive layer and the specific insulated portion are formed by placing first a semiconductive heat shrinkable tube and then an insulating heat shrinkable tube on the reinforcing insulation layer, whereafter both tubes are heat molded simultaneously together with the reinforcing insulation layer.

Further, when the reinforcing insulation layer made of a cross-linking agent containing thermoplastic resin, e.g., polyethylene, is heat treated to cross-link it and then first a semiconductive heat shrinkable tube followed by an insulating heat shrinkable tube are provided on the reinforcing insulation layer, followed by heating, penetration of the tip of the outer semiconductive layer in the specific insulated portion into the reinforcing insulation layer can be prevented. However, this method takes a relatively long time to connect the cable since heat molding is conducted twice. Nevertheless, this embodiment can reduce time for working or connecting electrical wires or cables since the heat shrinkable tube can be heat molded together with the reinforcing insulation layer simultaneously after the former is placed on the latter.

In this invention, it is for the purpose of preventing the occurrence of voids that heating of the connection part of electrical wires or cables is performed under pressure.

As a means for pressurization a method can be used in which the connection part is sealed in a pressurizing container and a gas, or oil or similar fluid is introduced under pressure, or a method can be used in which tension generated by winding the vulcanized rubber tape strongly around the connection part of the electrical wire or cable is used to create pressure. Of these methods the use of a pressurizing container and an inert gas such as nitrogen gas for pressurization is preferred, since the period of time required for heat molding can be shortened and at the same time it is possible to form a smooth finish on the surface of the connection part of the electrical wire or cable. A further advantage of this method is that there is no danger that the gas for pressurization will be incorporated in the reinforcing insulation layer since the reinforcing insulation layer is covered by the heat shrinkable tube, and that it is unnecessary to wipe out oils after heat molding. Thus, this invention fully utilizes the advantages derived by the use of heat shrinkable tubes.

EXAMPLES 1-3 AND COMPARISON EXAMPLES 1-5

In order to demonstrate the effects of this invention comparison was made between this invention (Examples 1 to 3) and conventional methods (Comparison Examples 1 to 5) as described below.

Insulated connection parts were formed using a cross-linked polyethylene insulated cable having a conductor of cross section of 150 mm$^2$ and an insulation layer of 7 mm in thickness according to the methods shown in Table 1 below.

TABLE 1

| Cable Connection Method | Comparison Example 1 | Comparison Example 2 | Comparison Example 3 | Comparison Example 4 |
|---|---|---|---|---|
| Reinforcing Insulation Layer (thickness: 10 mm) | Poured into a Metal Mold | Poured into a Metal Mold | Tape Wound | Tape Wound |
| Outer Semiconductive Member or Layer | Tape Wound | Tape Wound | Semiconductive Heat Shrinkable Tube | Semiconductive Heat Shrinkable Tube |
| Specific Insulated Portion (thickness: 3 mm length: 30 mm) Heat Molding | Tape Wound | Tape Wound | Insulating Heat Shrinkable Tube | Insulating Heat Shrinkable Tube |
| Reinforcing Insulation Layer | Shaped Simultaneously, Vulcanized Tape Wound *1 210° C. for 4 Hours | Vulcanized Tape Wound 210° C. for 4 Hours | Shaped Simultaneously, at 210° C. for 2 Hours under Nitrogen Gas Pressure *2 | Under Nitrogen Gas Pressure 210° C. for 2 Hours |
| Outer Semiconductive Member or Layer Provided with Specific Insulated Portion | (see above) | Vulcanized Tape Wound 210° C. for 2 Hours | (see above) | Under Nitrogen Gas Pressure 210° C. for 2 Hours |
| Reinforcing Insulation Layer (thickness: 10 mm) | Poured into a Metal Mold | Tape Wound | Poured into a Metal Mold | Poured into a Metal Mold |
| Outer Semiconductive Member or Layer | Semiconductive Heat Shrinkable Tube | Heat Shrinkable Tube Consisting of an Integrated Unit of Outer Semiconductive Member and Specific Insulated Portion | Heat Shrinkable Tube Consisting of an Integrated Unit of Outer Semiconductive Member and Specific Insulated Portion | Heat Shrinkable Tube Consisting of an Integrated Unit of Outer Semiconductive Member and Specific Insulated Portion |
| Specific Insulated Portion (thickness: 3 mm, length: 30 mm) Heat Molding | Insulating Heat Shrinkable Tube | (see above) | (see above) | (see above) |
| Reinforcing Insulation Layer | Shaped Simultaneously at 210° C. for 2 Hours under Nitrogen Gas Pressure | Shaped Simultaneously at 210° C. for 2 Hours under Nitrogen Gas Pressure | Shaped Simultaneously, Vulcanized Tape Wound at 210° C. for 4 Hours | Shaped Simultaneously at 210° C. for 2 Hours under Nitrogen Gas Pressure |
| Outer Semiconductive Member or Layer Provided with Specific Insulated Portion | (see above) | (see above) | (see above) | (see above) |

Note:
*1 Vulcanized tape wound: Vulcanized SBR rubber tape was elongated 10% and wound to a thickess of 10 mm to effect pressurization.
*2 Nitrogen gas pressure: Pressurization was performed at a pressure of 5 kg/cm$^2$ using a pressurizable container.

The appearance of the surface, condition of the tip of the outer semiconductive member on layer in the specific insulated portion, and AC initial breakdown value were compared and the results obtained are shown in Table 2 below.

TABLE 2

| Results | Comparison Example 1 | Comparison Example 2 | Comparison Example 3 | Comparison Example 4 |
|---|---|---|---|---|
| State of Interface between Reinforcing Insulation Layer and Outer Semiconduc- | Uneven | Uneven | Rather Uneven | Smooth |

TABLE 2-continued

| Results | Comparison Example 1 | Comparison Example 2 | Comparison Example 3 | Comparison Example 4 |
| --- | --- | --- | --- | --- |
| tive Member or Layer State of Tip of Outer Semiconductive Member or Layer in Specific Insulated Portion | Protrusion | No Protrusion | Protrusion Penetrating into Reinforcing Insulation Layer | No Protrusion |
| AC Initial Break Down Value | 80 KV | 160 KV | 110 KV | 170 KV |
| State of Interface between Reinforcing Insulation Layer and Outer Semiconductive Member or Layer | Smooth | Rather Uneven | Uneven | Smooth |
| State of Tip of Outer Semiconductive Member or Layer in Specific Insulated Portion | Protrusion Penetrating into the Reinforcing Insulation Layer | No Protrusion | No Protrusion | No Protrusion |
| AC Initial Break Down Value | 120 KV | 190 KV | 180 KV | 230 KV |

From the results shown in Table 2 above, it can be seen that forming insulated connection parts according to this invention as in Examples 1 to 3 is superior to the conventional methods as in Comparison Examples 2 and 4 in that this invention enables one to form the parts in a much shortened period of time, and in that this invention can prevent the occurrence of protrusion formed by fluidization or deformation of the tip of the outer semiconductive layer in the specific insulated portion, which was observed in Comparison Example 1 or penetration of the tip of the outer semiconductive layer in the specific insulated portion into the reinforcing insulation layer, which was encountered in Comparison Examples 3 and 5. Thus, this invention can provide a cable connection having improved electrical properties.

While the invention has been described in detail and with reference to specific embodiments thereof, it will be apparent to one skilled in the art that various changes and modifications can be made therein without departing from the spirit and scope thereof.

What is claimed is:

1. A heat-shrinkable tube for use in forming a connection part for shielded polyolefin insulated electrical wires or cables which comprises an integrated assembly of two cylindrical heat-shrinkable semiconductive members arranged end-to-end, and a specific insulated portion consisting of said two cylindrical heat-shrinkable semiconductive members surrounded and joined at the adjacent ends thereof by an insulation material.

2. The heat shrinkable tube of claim 1 wherein the shrink ratio of a narrow region including said specific insulated portion is smaller than that of the remainder of the heat shrinkable tube.

3. The heat-shrinkable tube of claim 1, wherein a portion of each adjacent end of the cylindrical heat-shrinkable semiconductive members is folded back upon itself.

4. The heat-shrinkable tube of claim 1, wherein said two heat-shrinkable semiconductive members are joined such that they partially overlap each other at the adjacent ends thereof.

* * * * *